United States Patent
Nangeroni et al.

(10) Patent No.: US 8,722,754 B2
(45) Date of Patent: May 13, 2014

(54) EXTRUDED FOAMS MADE WITH POLYLACTIDES THAT HAVE HIGH MOLECULAR WEIGHTS AND HIGH INTRINSIC VISCOSITIES

(75) Inventors: James Nangeroni, Doylestown, PA (US); Jed Richard Randall, Minneapolis, MN (US)

(73) Assignee: NatureWorks LLC, Minnetonka, MN (US)

( * ) Notice: Subject to any disclaimer, the term of this patent is extended or adjusted under 35 U.S.C. 154(b) by 64 days.

(21) Appl. No.: 12/988,810

(22) PCT Filed: Apr. 24, 2009

(86) PCT No.: PCT/US2009/041641
§ 371 (c)(1),
(2), (4) Date: Oct. 21, 2010

(87) PCT Pub. No.: WO2009/134688
PCT Pub. Date: Nov. 5, 2009

(65) Prior Publication Data
US 2011/0039962 A1    Feb. 17, 2011

Related U.S. Application Data

(60) Provisional application No. 61/049,170, filed on Apr. 30, 2008.

(51) Int. Cl.
*C08J 9/00* (2006.01)
*C08J 9/12* (2006.01)

(52) U.S. Cl.
USPC ........... 521/182; 528/271; 528/272; 528/296; 528/302; 525/50; 525/54.2

(58) Field of Classification Search
USPC ............. 521/79, 182; 528/271, 272, 296, 302
See application file for complete search history.

(56) References Cited

U.S. PATENT DOCUMENTS

| | | | |
|---|---|---|---|
| 5,134,171 A * | 7/1992 | Hammel et al. | 521/98 |
| 5,238,968 A | 8/1993 | Morita | |
| 5,422,053 A | 6/1995 | Sterzel | |
| 5,914,381 A * | 6/1999 | Terado et al. | 527/300 |
| 6,310,171 B1 * | 10/2001 | Naito et al. | 528/49 |
| 2004/0068059 A1 * | 4/2004 | Katayama et al. | 525/466 |
| 2007/0293593 A1 * | 12/2007 | Harfmann | 521/79 |
| 2008/0262118 A1 | 10/2008 | Cink | |

FOREIGN PATENT DOCUMENTS

| | | | |
|---|---|---|---|
| JP | 2002-322309 A | | 11/2002 |
| JP | 2003-073495 A | | 3/2003 |
| JP | 2004026876 A | * | 1/2004 |
| WO | WO 2005/097878 A | | 10/2005 |
| WO | WO 2005097878 A1 | * | 10/2005 |

OTHER PUBLICATIONS

Nagasubramanian, K.; Saito, O.; Graessley, W.W. "Intrinsic Viscosity in Branched Free-Radical Polymers." Journal of Polymer Science: Part A-2. vol. 7 (1969), pp. 1955-1964.*
Rubinstein, M.; Colby, R.H. "Chapter 1.7: Molar mass measurements" in "Polymer Physics" (2004). pp. 26-33.*
Nagasubramanian, K; Saito, O; Graessley, W.W. "Intrinsic Viscosity in Branched Free-Radical Polymers" in Journal of Polymer Science: Part A-2. vol. 7 (1969), pp. 1955-1964.*

* cited by examiner

*Primary Examiner* — Randy Gulakowski
*Assistant Examiner* — Christina Wales
(74) *Attorney, Agent, or Firm* — Gary C Cohn PLLC

(57) ABSTRACT

This invention provides an economical process for extruding a PLA resin into a low density foam with a high closed cell content. Excellent quality, low density foam is produced easily and reproducibly. The PLA resin in the foam has a weight average molecular weight of at least 500,000 and an intrinsic viscosity of at least 1.4 deciliters/gram.

10 Claims, No Drawings

EXTRUDED FOAMS MADE WITH POLYLACTIDES THAT HAVE HIGH MOLECULAR WEIGHTS AND HIGH INTRINSIC VISCOSITIES

This application claims benefit from U.S. Provisional Application No. 61/049,170, filed 30 Apr. 2008.

This invention relates to extruded polymer foams and processes for preparing them.

Polylactide polymers (PLA, sometimes referred to as polylactic acid) are now available in commercial quantities. Attempts have been made to extrude this polymer into foam, but PLA processes into a foam with difficulty. Good quality, low density extruded PLA foams have not become available. Resins like PLA that have low melt strength usually can be foamed only within a very narrow range of processing temperatures, if at all. Under commercial scale production conditions, it is not feasible to maintain such narrow operating ranges.

WO 2005/097878 describes PLA foams made using carbon dioxide as the blowing agent. An excess of the carbon dioxide is used over that amount needed to provide the desired foam density, in order to plasticize the melt and improve processing. This approach has certain limitations. Many manufacturers lack the equipment necessary to inject a pressurized gas into their foam lines. Other manufacturers prefer to use liquid or low-boiling hydrocarbons or hydrofluorocarbon blowing agents.

Other approaches to improving the extrusion foaming of PLA resins have focused on the rheological properties of the molten polymer. PLA is a low melt strength material, and it is this low melt strength that is believed to contribute to the difficulty in producing extruded foams from PLA resin. Melt strength can be improved by increasing molecular weight, but this approach by itself has not led to a viable foam extrusion process. Molecular weight increases can cause other problems, such as increasing shear viscosity, causing increased power consumption, reducing processing rates and/or require heavier, more expensive equipment. Another approach is to broaden the molecular weight distribution, by introducing a small amount of long chain branching into the polymer. Branched PLA resins having a weight average molecular weight of up to about 400,000 have been reported in WO 2006/002372, by reacting a linear PLA resin with an epoxy-functional acrylate polymer or polymer. Other branching approaches have been described in U.S. Pat. Nos. 5,359,026, 5,594,095, 5,798,435, 5,210,108 and 5,225,521, GB 2277324, EP 632 081 and WO 02/100921A1.

Unfortunately, these branched PLA resin still do not process well. In particular, it has proven difficult to prepare low density (<5 pounds/cubic foot, 80 kg/m$^3$), highly closed cell (90+% closed cell) plank or sheet foam at a commercially reasonable rate. To the extent that good quality foams can be prepared at all at commercial scale, they must be produced at low production rates, which significantly increases their costs.

Therefore, there remains a need to provide an economical process for preparing highly closed-cell, low density extruded sheet and plank foam.

This invention is a process that comprises forming a pressurized, molten mixture of a melt-processable branched polylactide (PLA) resin containing about 2 to about 20% by weight, based on the weight of the PLA resin, of a physical blowing agent, and extruding the molten mixture through a die to a region of reduced pressure such that the blowing agent expands and the PLA resin simultaneously cools to form a stable foam, wherein the PLA resin has a weight average molecular weight of from 500,000 to 1,500,000, and an intrinsic viscosity of at least 1.40 deciliters/gram.

This process can produce foams having densities in the range of from 1 to 5 pounds/cubic foot (16-80 kg/m$^3$), which have 90% or more closed cells, and do so at commercially acceptable operating rates. Very high quality extruded foams are prepared in these processes. The process is useful to produce foam sheet and plank (or board) products that represent the highest volume types of extruded foam products.

The PLA resin used herein is characterized in terms of its weight average molecular weight and intrinsic viscosity. The weight average molecular weight ($M_w$) of the PLA resins is as least 500,000, and may be as high as 1,500,000. It is preferably at least 550,000, more preferably at least 750,000, and is preferably up to 1,100,000. For purposes of this invention, weight average molecular weight is determined by gel permeation chromatography against a polystyrene standard. Particulars of a suitable method are described in the examples that follow.

Intrinsic viscosity is measured according to the principles of ASTM D5225. Polymer concentration is calculated from refractive index measurements and intrinsic viscosity is determined from viscometer detection in combination with concentration. Particulars of a suitable method are described in the examples below. The PLA resin has an intrinsic viscosity of at least 1.40 deciliters/gram (dl/g). It preferably has an intrinsic viscosity of at least 1.57 deciliters/gram, more preferably at least 1.585 deciliters/gram and still more preferably at least 1.6 deciliters/gram. The intrinsic viscosity may be as high as 1.8 deciliters/gram, and more preferably as high as 1.70 deciliters/gram.

The intrinsic viscosity of the PLA resin is believed to be affected by a number of attributes of the PLA resin, including the weight average molecular weight, the molecular weight distribution, and the extent of branching. The relatively high intrinsic viscosity PLA resins used in this invention are generally highly branched polymers having a somewhat broad molecular weight distribution.

Preferred PLA resins have an average of at least 8 branches per molecule. More preferred PLA resins have an average of at least 10 branches per molecule. The PLA resin may have up to 20 branches per molecules, and preferably has up to about 15 branches per molecule. The number of branches per molecule is calculated using Viscotek™ OmniSEC version 4.5 software. Known Mark-Houwink constants for a linear PLA of the same enantiomeric composition as the sample and a structure factor of 0.75 are used in making the calculation. Mark-Houwink constants for PLA resins are described by Dorgan et al., "Fundamental solution and single-chain properties of polylactides", *Journal of Polymer Science*, Part B: Polymer Physics (2005), 43(21), 3100-3111.

The PLA resin preferably contains a high molecular weight fraction of at least 2.5 weight percent, preferably at least 3 weight percent. This high molecular weight fraction may constitute as much as 10 weight percent of the PLA resin, but preferably does not constitute more than 6 weight percent thereof. For purposes of this invention, the high molecular weight fraction consists of PLA molecules of 3 million or higher molecular weight, as determined by GPC methods as described below.

The PLA resin preferably contains no more than 4 weight percent, more preferably no more than 3 weight percent and even more preferably no more than 2 weight percent of a low molecular weight fraction. For purposes of this invention, the low molecular weight fraction consists of molecules of 30,000 molecular weight or below as determined by GPC methods as described below.

A preferred PLA resin for use in this invention has an $M_w$ of at least 550,000, an intrinsic viscosity of from 1.4 to 1.8 deciliters/gram, more preferably from 1.570 to 1.8 deciliters/gram, and an average of at least 10 branches/molecule. Another preferred PLA resin has an $M_w$ of at least 700,000, an intrinsic viscosity of from 1.4 to 1.8 deciliters/gram, especially from 1.585 to 1.8 deciliters/gram, and an average of at least 10 branches/molecule. Still another preferred PLA resin has an $M_w$ of 700,000 to 1,100,000, an intrinsic viscosity of from 1.4 to 1.7 deciliters/gram, especially from 1.585 to 1.7 deciliters/gram and an average of at least 10 branches/molecule.

For purposes for this invention, a PLA resin is a polymer or copolymer that contains at least 50% by weight of polymerized lactic acid repeating groups. The PLA resin may contain at least 80%, at least 90%, at least 95% or at least 99% by weight polymerized lactic acid units. When the PLA resin is a copolymer of lactic acid and another monomer, the other monomer can be any that will copolymerize with lactide. Preferred other monomers are hydroxycarboxylic acids or, preferably, cyclic esters such as glycolic acid.

The lactic acid repeating units may be either the L- or D-enantiomer, or mixtures thereof. The ratio of the lactic acid enantiomers and the manner in which they are copolymerized (i.e., randomly, block, multiblock, graft and like) greatly influence the crystalline behavior of the polymer. Polymers that are very high in one lactic acid enantiomer (i.e., 93% or more, especially 96% or more of one enantiomer, based on total lactic acid units) tend to be semi-crystalline. Polymers containing 7% or more of each enantiomer based on total lactic acid units tend to be more amorphous.

A preferred PLA resin is a homopolymer (exclusive of any branching agents) of either L-lactic acid or D-lactic acid, a random copolymer of L-lactic acid and D-lactic acid, a block copolymer of L-lactic acid and D-lactic acid, or a mixture of two or more of these. Copolymers containing from 75 to 99% of one lactic acid enantiomer and from 1 to 25% of the other lactic acid enantiomer are particularly suitable PLA resins for use in this invention. A more preferred copolymer contains from about 85 to 98% of one enantiomer and from 2 to 15% of the other enantiomer. An especially preferred copolymer contains from about 95 to 97% of one enantiomer and 3 to 5% of the other enantiomer. All percentages in this paragraph are based on the total weight of lactic acid units in the polymer.

The PLA resin can be formed by polymerizing lactide. Lactide is a dimeric form of lactic acid, in which two lactic acid molecules are condensed to form a cyclic diester. Lactide exists in a variety of stereoisomeric forms, i.e., "L-lactide", which is a dimer of two L-lactic acid molecules, "D-lactide", which is a dimer of two D-lactic acid molecule, and "meso-lactide", which is a dimer formed from one L-lactic acid molecule and one D-lactic acid molecule. In addition, 50/50 mixtures of L-lactide and D-lactide that have a melting temperature of about 126° C. are often referred to as "D,L-lactide". Any of these forms of lactide, or mixtures thereof, can be copolymerized to form a PLA resin for use in this invention. The L/D ratio in the PLA resin is controlled through the ratio of these stereoisomeric forms of lactide in the lactide mixture that is polymerized. In an especially preferred process, mixtures of L-lactide and meso-lactide are polymerized to form a polymer having a controlled level of D-lactic acid enantiomeric units. A small amount of D-lactide may be present in such a mixture. In another preferred process, a mixture of L- and D-lactide, which may contain a small amount of meso-lactide, is polymerized. Suitable processes for polymerizing lactide to form PLA having controlled L/D ratios are described, for example, in U.S. Pat. Nos. 5,142,023 and 5,247,059, both incorporated herein by reference. Copolymerized branching agents may be added to the polymerization process.

In addition, the linear PLA resin can be made by polymerizing lactide or lactic acid, or copolymerizing either of them with a copolymerizable monomer. The resulting materials may be further reacted with a bi- or polyfunctional coupling agent to extend the molecular weight.

A preferred way of introducing branching is to treat a linear PLA resin with a reactive branching agent. Before branching, the linear PLA resin suitably has a number average molecular weight of at least 40,000, preferably at least 80,000. The reactive branching agent contains multiple functional groups that can react with reactive groups, notably hydroxyl and/or carboxylic acid groups that in most cases terminate the PLA polymer chains. A particularly preferred branching agent is an epoxy-functional acrylate polymer or copolymer as described in WO 2006/002372. The acrylate polymer or copolymer is characterized in being a solid at 23° C., containing an average of from about 2 to about 15 free epoxide groups/molecule (such as from about 3 to about 10 or from about 4 to about 8 free epoxide groups/molecule), and being a polymerization product of at least one epoxy-functional acrylate or methacrylate monomer, preferably copolymerized with at least one additional monomer.

The acrylate polymer or copolymer suitably has a molecular weight per epoxide group of about 150 to about 700, such as about from 200 to 500 or about from 200 to 400. The acrylate polymer or copolymer suitably has a number average molecular weight of about 1000 to 6000, such as from about 1500 to 5000 or about 1800 to 3000.

Suitable acrylate copolymers are commercially available from BASF Corporation under the trade name Joncryl®. Particularly preferred products include Joncryl® ADR4300, Joncryl® ADR 4368, Joncryl® ADR 4370, Joncryl® ADR 4380, Joncryl® ADR 4383 and Joncryl® ADR 4369 polymers.

It is preferred to use from about 0.02 to about 0.45, preferably from 0.05 to 0.4, moles of acrylate polymer or copolymer per mole of linear PLA resin to produced a branched PLA resin for use in this invention. The number of equivalents of epoxy groups on the acrylate polymer or copolymer per mole of PLA resin is advantageously in the range of about 0.1 to about 1.

A convenient way of branching a PLA resin is to melt combine a molten, starting PLA resin with a branching agent in an extruder. The branching reaction then takes place in the extruder barrel before cooling. In some embodiments, the branching is only partially completed, and the partially branched material is used as the PLA resin component in a subsequent foam extrusion process. In other embodiments, the branching is only partially completed, and the partially branched material is used as a masterbatch in the subsequent foam extrusion process. In that case, the partially branched material is let down with additional linear PLA resin during the foam extrusion process. In yet other embodiments, the branching agent can be added to the extruder during the foam extrusion process, and all of the branching takes place during the foam extrusion process. Embodiments of the last type are generally less preferred, as it can be difficult to obtain the necessary build-up of molecular weight and branching during the foam extrusion process, unless the line is operated at low output rates.

It will be appreciated that the molecular weight, intrinsic viscosity and other characteristics of the PLA resin, as are described above, apply with respect to the PLA resin that exits the extruder die and thus forms the polymer phase of the foam product. All of these parameters are subject to some amount of change as a PLA resin is thermally processed to form the foam. Therefore, the molecular weight, intrinsic viscosity and other characteristics of the starting resin may be significantly different than those of the extruded product. This is particularly true when some or all of the branching reactions occur during the foam extrusion process. However, some changes are usually seen even when a branched PLA resin is used as a starting material in the foam extrusion process. For example, some degradation of molecular weight and some change in molecular weight distribution are sometimes seen, even when no further branching takes place. These processes can affect the intrinsic viscosity of the resin as it passes through the extruder.

Foam is made in accordance with the invention in a melt extrusion process. In the melt-extrusion process, a molten mixture is formed. The molten mixture contains the branched PLA resin described above and 2 to 20% by weight, based on the weight of the PLA resin, of a physical and/or chemical blowing agent. The molten mixture may contain additional components as described further below. The molten mixture is extruded through a die to a region of reduced pressure such that the blowing agent expands and the PLA resin simultaneously cools to form a stable foam. This is preferably a circular slit die, a linear slit die or a "dog-bone" die, as are used to make sheet and/or plank (board) foam products.

Conventional foam extrusion equipment is entirely suitable for producing the foam. Thus, screw extruders, twin screw extruders and accumulating extrusion apparatus can all be used. Suitable processes for making extruded foams from resin/blowing agent mixtures are described in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,302,910; 4,421,866; 4,438,224; 4,454,086 and 4,486,550. All of those processes are generally applicable for making extruded foam according to this invention.

In the extrusion process, the PLA resin is heated to a temperature at or above its glass transition temperature (if amorphous) or melting point (if semi-crystalline). Suitable temperatures are at least 140° C., more preferably at least 160° C. and still more preferably at least 240° C., but preferably no greater than 240° C. Processing temperatures should take the effect on bulk melt temperature due to the input of mechanical energy into the polymer as it is mixed and conveyed down the extruder. The PLA resin used in this invention has a somewhat high sensitivity to mechanical heating because of its high molecular weight. In certain cases, screw designs may be modified to reduce the shear heating and maintain the melt temperature below the thermal degradation limit, which is nominally 240° C. This can be done in a number if ways, including increasing the gap between the barrel wall and flight tip, decreasing the width of the flight tip, increasing the clearance of any blister rings used to create melt seals and increasing the gap in any flighted areas on melt mixing elements.

The blowing agent is introduced and mixed into the heat-plasticized PLA resin. Auxiliary foaming aids as discussed below are also blended into the melt, if they are used. Pressures during the mixing step are maintained high enough so that the blowing agent remains dissolved throughout the molten resin and foam expansion does not begin until the molten mixture passes through the extrusion die. Supercritical conditions are preferably maintained throughout the extrusion process if carbon dioxide is used as all or of part of the blowing agent.

After all components are blended, the temperature of the molten mixture is usually adjusted downward somewhat (to the "extrusion temperature") before the mixture is passed though the extrusion die to form the foam product. The optimal range of extrusion temperatures for any system may depend somewhat on the particular PLA resin that is used (notably, the enantiomer ratio of the lactic acid units in the polymer) and the blowing agent, and the extent of crystallization that is desired in the foam. The extrusion temperature in general is from about 70° C. to 160° C. Except when carbon dioxide is the primary foaming agent, the extrusion temperature is preferably at least 120° C., and preferably as high as 145° C. A preferred range of extrusion temperatures is from 85 to 105° C. when carbon dioxide is the sole or primary blowing agent.

The blowing agent in this invention preferably is a physical blowing agent, i.e., one which forms a blowing gas by volatilization of a liquid or by expansion of a gas. Examples of physical blowing agents include fluorocarbons, hydrofluorocarbons hydrocarbons, hydrochlorofluorocarbons, lower alkanols, alkyl chlorides, alkyl ethers, nitrogen gas and carbon dioxide. Blowing agents of these types are well known. Specific examples include R-134a, R-142a, R-153a, isobutane and other butane isomers, isobutene, isopentane, and other pentane isomers.

From about 2 to 20 parts by weight of a physical blowing agent are used per 100 parts by weight of the PLA resin. The precise amount used in any particular case will depend on the particular blowing agent and the desired foam density. It is preferred to use enough of the blowing agent to produce a foam having a density of from 1 to 5 pounds/cubic foot (16-80 kg/m$^3$). It is more preferred to use enough of the blowing agent to form a foam having a density of from 1.25 to 2.5 pounds/cubic foot (24-40 kg/m$^3$). When the blowing agent is soluble in the PLA resin, as is the case with carbon dioxide, an additional quantity of the blowing agent may be used to help plasticize the melt and improve processing. Carbon dioxide is preferably used at the 5-13.5% range, based on the weight of the PLA resin.

The foam can be extruded into any variety of shapes, but will most commonly be extruded to form sheet products that have a nominal thickness of 13 mm or less, or plank products that have a nominal thickness over 13 mm. Sheet products are conveniently made using an annular slit die, producing a tubular foam that is slit longitudinally to form a flat sheet. Plank products are conveniently made using a rectangular slit or "dog-bone" die. The foamable mixture is preferably extruded to form a foam having, before any subsequent fabrication, a cross-sectional thickness of at least 1 mm, more preferably at least 3 mm, most preferably at least 5 mm, up to 200 mm or more.

Alternatively, the molten mixture may be extruded through a die including a multiplicity of orifices arranged such that contact between adjacent streams of the molten extrudate occurs during the foaming process. This causes the contacting surfaces to adhere to one another well enough to produce a unitary structure. Methods for forming such coalesced strand foams are described in U.S. Pat. Nos. 6,213,540 and 4,824,720, both incorporated herein by reference. These coalesced strand foams tend to be highly anisotropic, with the highest compressive strengths generally being observed in the extrusion direction. The coalesced strand foam may include missing strands or designed voids, as described in U.S. Pat. No. 4,801,484, incorporated by reference herein.

Various auxiliary materials can be used in the foaming process. Common such auxiliary materials include nucleating agents, cell enlarging agents, stability control agents (permeability modifiers), antistatic agents, crosslinkers, processing aids (such as slip agents), stabilizers, flame retardants, ultraviolet absorbers, acid scavengers, dispersion aids, extrusion aids, antioxidants, colorants, inorganic fillers and the like. Nucleating agents and extrusion aids are preferred.

Preferred nucleating agents include finely divided inorganic substances such as calcium carbonate, calcium silicate, indigo, talc, clay, mica, kaolin, titanium dioxide, silica, calcium stearate or diatomaceous earth, as well as small amounts of chemicals that react under extrusion conditions to form a gas, such as a mixture of citric acid or sodium citrate and sodium bicarbonate. The amount of nucleating agent employed may range from about 0.01 to about 5 parts by weight per hundred parts by weight of a polymer resin. The preferred range is from 0.1 to about 1 part by weight, especially from about 0.25 to 0.6 parts by weight.

The expanded foam will typically have a density of below 5 pounds/cubic foot (pcf) (80 kg/m$^3$), and most often below 4.0 pcf (64 kg/m$^3$), as measured according to ASTM D-1622. Density may be as low as 1.25 pcf (20 kg/m$^3$) or less. Densities of about 2.5 to about 4.0 pcf (40-64 kg/m$^3$) are preferred. The foam will typically have an average cell size of at least 0.01 mm, preferably at least 0.05 mm, and more preferably at least 0.1 mm; and advantageously no greater than 5 mm, preferably no greater than 4 mm and more preferably no greater than 3 mm, as measured according to ASTM D3576.

The closed cell content of the foam is preferably at least 90%, as determined according to ASTM D2856-A.

The foam may be subjected to various subsequent processing steps if desired. It is often desired to cure closed-cell foams to accelerate the replacement of the blowing agent in the cells with air. This prevents foam shrinkage and preserves dimensional stability. Process steps intended to reduce the curing time include perforation, as described in U.S. Pat. No. 5,424,016, heating the foam at slightly elevated (100-130° F. (38-73° C.)) temperatures for a period of days to weeks, or combinations thereof. In addition, the foam may be crushed in order to open cells.

The foam is in most cases readily thermoformable or otherwise capable of being shaped under heat and mechanical pressure to a desired shape or contour, depending on the application. If desired, a decorative layer such as a fabric layer of woven thermoplastic fibers may be thermally welded or otherwise adhered to the foam during or after the thermoforming process. The foam may be laminated to other foam structures, films, or other substrates.

It has been found that foam made using an amorphous PLA resin is often capable of becoming semi-crystallized if subjected to post-foaming heat treatment or heat annealing, particularly if the blowing agent is mainly or wholly carbon dioxide. Heat annealing is conveniently performed at an elevated temperature, above the glass transition temperature but below the melting temperature of the PLA resin, for a period of from about 20 seconds to about 24 hours, depending on the amount of crystallinity that is desired. A preferred heat annealing temperature is from about 90° C., preferably from about 100° C., to about 110° C. It has been found that crystallinity levels of 10 to 24 J/g or even higher can be imparted to the foam in this manner.

As mentioned before, the foam of this invention is adapted for use in various applications. Closed celled foam panels according to the invention are useful as thermal building insulation or to insulate roofing, walk-in refrigerators and freezers, transportation devices, water heaters, storage tanks and the like. They are also useful in other insulation applications. Closed and open cell foams according to the invention can be used in a variety of packaging and cushioning applications such as electronics and consumer goods packaging. Softer foams according to the invention are useful as acoustical insulation. Rigid foams are useful for composite structure elements, lightweight panels and the like.

The following examples illustrate the invention, but are not intended to limit it in any way. All parts and percentages are by weight unless otherwise indicated.

EXAMPLES 1 AND 2

In these examples, PLA extruded foam is continuously produced on a tandem extrusion line. The tandem extrusion line consists of a 3.5-inch diameter primary extruder (30:1 L/D) which feeds a 4.5-inch secondary extruder (36:1 L/D). The screw of the primary extruded is equipped with a gas injection nozzle just after the melting section to allow the addition of blowing agent. The primary extruder is fed with a series of volumetric feeders that allow for addition of small amount of additives. The secondary extruder is equipped with an annular die (4.5-inch diameter). The extrudate is stretched over a 16-diameter mandrel, slit in one location then flattened passed through an S-wrap to a winder.

To make foam Example 1, linear PLA resin having an L- to D-enantiomer ratio of about 96:4 (NatureWorks® 3051D, from NatureWorks LLC, a 80/20 PLA/talc masterbatch (S-1418 from Polyvel, Inc.) and a 70/30 masterbatch of NatureWorks 3051D resin and Joncryl™ ADR 4368C polymer (CESA Extend OMAn 698493) are fed into the primary extruder at a weight ratio of 95.7:2:2.3. This mixture contains 0.4% talc and 0.7% of the Joncryl™ ADR 4368C polymer. R152a (difluoroethane) is added at a rate of 5.8% to the melt in the primary extruder.

The melt exiting the die of the secondary extruder is stretched over a 16-inch diameter mandrel, slit in one location, flattened, and then passed through an S-wrap to a winder, where it is wound onto rolls.

Foam Example 2 is made in the same manner, except that the starting materials are first compounded into pellets by extruding them through as 30-mm Werner and Pfleiderer twin screw extruder. The pellets are then fed into the primary extruder and processed into foam.

The extruder temperatures and operating speeds used to make foam Examples 1 and 2 are listed in Table I.

TABLE I

|  | Example 1 | Example 2 |
|---|---|---|
| Primary Extruder (° C.) | | |
| Barrel zone 1 | 149 | 149 |
| Barrel zone 2 | 193 | 193 |
| Barrel zone 3 | 204 | 204 |
| Barrel zone 4 | 204 | 204 |
| Barrel zone 5 | 204 | 204 |
| Barrel zone 6 | 204 | 204 |
| Cross over (° C.) | | |
| Screen changer body | 215 | 215 |
| Screen changer slide | 215 | 215 |
| Cross over pipe | 215 | 215 |
| Secondary extruder (° C.) | | |
| Rear seal | 71 | 71 |
| Barrel zone 1 | 143 | 143 |
| Barrel zone 2 | 132 | 132 |
| Barrel zone 3 | 106 | 105 |
| Barrel zone 4 | 99 | 100 |
| Die (° C.) | | |
| Die spider and core pin | 143 | 143 |

TABLE I-continued

|  | Example 1 | Example 2 |
|---|---|---|
| Die Body | 143 | 143 |
| Die Outer Lips | 143 | 143 |
| Primary screw speed (RPM) | 25 | 25 |
| Secondary screw speed (RPM) | 8.9 | 8.9 |
| Primary discharge pressure (PSI | 2362 | 2550 |
| Die Pressure (PSI) | 1516 | 1492 |
| Primary discharge melt (° C.) | 225 | 222 |
| Die discharge melt (° C.) | 143 | 143 |
| Total Output (kg/hr) | 60 | 60 |
| Gas Addition (kg/hr) | 3.5 | 3.5 |

The density and closed cell content of the resulting foams are tested according to ASTM D-1622 and ASTM D-3576, respectively. Polymeric material from the foam is evaluated for intrinsic viscosity and absolute $M_w$ as follows:

0.5 g samples are dissolved in 9.6 mL methylene chloride. A 0.25 mL aliquot of stock solution is transferred to a 20 mL vial and diluted with 9.75 mL tetrahydrofuran. Samples are filtered through a 0.2 micron syringe filter into an autosampler vial. Absolute molecular weight and intrinsic viscosity determinations are then made using a multi-detector Viscotek gel permeation chromatography system comprised of: a Viscotek GPCmax VE2001 GPC solvent/sample module, a Viscotek TDA 302 triple detector array module, a computer running Viscotek OmniSEC version 4.5 software, a Viscotek low molecular weight mixed-bed GPC column, and a Viscotek high molecular weight mixed-bed GPC column.

The instrument is calibrated using a polystyrene narrow molecular weight polymer standard (midpoint molecular weight approximately 116,000), and is tested for accuracy with a broad molecular weight polystyrene check sample. The polymer concentration is calculated from refractive index, using a dn/dc of 0.046 ml/g for PLA samples and 0.185 ml/g for the polystyrene standards. Absolute weight average molecular weight ($M_w$) is determined by right angle and low angle light scatter in combination with the concentration. Intrinsic viscosity is determined from viscometer detection in combination with concentration, according to the principles of ASTM D5225.

Results of the foam and polymer testing are summarized in Table 2.

TABLE 2

|  | Example 1 | Example 2 |
|---|---|---|
| Intrinsic Viscosity (g/dl) | 1.67 | 1.66 |
| Absolute $M_w$ (Daltons) | 584,000 | 560,000 |
| Density (kg/m³) | 56 | 53 |
| Closed cell content (%) | 98 | 91 |

What is claimed is:

1. A process that comprises forming a pressurized, molten mixture of a melt-processable branched polylactide (PLA) resin containing about 3 to about 25% by weight of a blowing agent, based on the weight of the PLA resin, and extruding the molten mixture through a die to a region of reduced pressure such that the blowing agent expands and the PLA resin simultaneously cools to form a stable foam, wherein the PLA resin in the foam (1) is the reaction product of a linear PLA resin having a number average molecular weight of at least 80,000 with a reactive branching agent which contains multiple functional groups that can react with hydroxyl and/or carboxylic acid groups that terminate the PLA polymer chains, (2) has an absolute weight average molecular weight of from 550,000 to 1,500,000 as determined by dissolving 0.5 g samples of the PLA resin in 9.6 mL of methylene chloride, transferring 0.25 mL of the PLA resin solution into a 20 mL vial and diluting it with 9.75 mL tetrahydrofuran, filtering the diluted sample, measuring the refractive index, right angle light scatter and low angle light scatter using a multi-detector gel permeation chromatography (GPC) system comprised of a Viscotek GPCmax VE2001 GPC solvent/sample module, a Viscotek TDA 302 triple detector array module, a computer running Viscotek OmniSEC version 4.5 software, a Viscotek low molecular weight mixed-bed GPC column, and a Viscotek high molecular weight mixed-bed GPC column, and calculating the polymer concentration from the refractive index using a dn/dc of 0.045 ml/g for the PLA resin sample, and determining the absolute molecular weight from the right angle light scatter and the low angle light scatter in combination with the polymer concentration, (3) has an intrinsic viscosity of from 1.570 to 1.8 deciliters/gram, and (4) has an average of at least 10 branches/molecule.

2. The process of claim 1 wherein the blowing agent is a physical blowing agent.

3. The process of claim 2, wherein the foam has a density of no greater than 5 pounds/cubic foot (80 kg/m³).

4. The process of claim 3, wherein the foam has a closed cell content of at least 90%.

5. The process of claim 3 wherein the PLA resin in the foam has an $M_w$ of at least 700,000, an intrinsic viscosity of 1.585 to 1.8 deciliters/gram, and an average of at least 10 branches/molecule.

6. The process of claim 3 wherein the PLA resin in the foam has an $M_w$ of 700,000 to 1,100,000, an intrinsic viscosity of 1.4 to 1.7 deciliters/gram, and an average of at least 10 branches/molecule.

7. The process of claim 6 wherein the PLA resin as an intrinsic viscosity of from 1.585 to 1.7 deciliter/gram.

8. The process of claim 3 wherein the PLA resin contains at least 3 weight percent of a high molecular weight fraction that consists of PLA molecules of 3 million or higher molecular weight.

9. The process of claim 3 wherein the blowing agent is carbon dioxide.

10. The process of claim 1 wherein the branching agent is an epoxy-functional acrylate polymer or copolymer characterized in being a solid at 23° C., containing an average of from about 3 to about 10 free epoxide groups/molecule, and being a polymerization product of at least one epoxy-functional acrylate or methacrylate monomer.

* * * * *